United States Patent
Kim et al.

(10) Patent No.: US 11,716,450 B2
(45) Date of Patent: Aug. 1, 2023

(54) METHOD AND APPARATUS FOR CONFIGURING DETECTION AREA BASED ON ROTATABLE CAMERA

(71) Applicant: ELECTRONICS AND TELECOMMUNICATIONS RESEARCH INSTITUTE, Daejeon (KR)

(72) Inventors: Young-Il Kim, Sejong-si (KR); Seong Hee Park, Daejeon (KR); Soonyong Song, Sejong-si (KR); Geon Min Yeo, Daejeon (KR); Il Woo Lee, Daejeon (KR); Wun-Cheol Jeong, Daejeon (KR); Tae-Wook Heo, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 254 days.

(21) Appl. No.: 17/104,289

(22) Filed: Nov. 25, 2020

(65) Prior Publication Data
US 2021/0218901 A1    Jul. 15, 2021

(30) Foreign Application Priority Data

Nov. 25, 2019    (KR) .................. 10-2019-0152717
Nov. 25, 2020    (KR) .................. 10-2020-0159484

(51) Int. Cl.
*H04N 7/18*    (2006.01)
*G06T 7/20*    (2017.01)
(Continued)

(52) U.S. Cl.
CPC .............. *H04N 7/188* (2013.01); *G06T 7/20* (2013.01); *G06V 10/147* (2022.01); *G06V 20/00* (2022.01);
(Continued)

(58) Field of Classification Search
None
See application file for complete search history.

(56) References Cited

U.S. PATENT DOCUMENTS 9,036,039 B2    5/2015    Lee et al.
9,786,064 B2    10/2017   Um et al.
(Continued)

FOREIGN PATENT DOCUMENTS

KR    10-2008-0045318 A    5/2008
KR    10-0879623 B1       1/2009
(Continued)

OTHER PUBLICATIONS

Evsen Yanmaz et al., "A Discrete Stochastic Process for Coverage analysis of UAV networks", IEEE Globecom 2010 Workshop on Wireless Networking for Unmanned Aerial Vehicles.
(Continued)

*Primary Examiner* — James M Anderson, II
(74) *Attorney, Agent, or Firm* — LRK Patent Law Firm

(57) ABSTRACT

In order to detect an unmanned aerial vehicle (UAV) in a monitoring area using a rotatable camera, an integrated sensor configures a first detection area in the monitoring area by rotating the camera after fixing the focal length of the camera to an initial value, and configures a second detection area in the monitoring area by rotating the camera after changing at least one of the focal length of the camera and a rotation path representing a distance from the origin of the monitoring area.

15 Claims, 9 Drawing Sheets

(51) Int. Cl.
  *H04N 23/695* (2023.01)
  *H04N 23/90* (2023.01)
  *H04N 23/959* (2023.01)
  *G06V 10/147* (2022.01)
  *G06V 20/00* (2022.01)
  *G06V 20/52* (2022.01)

(52) U.S. Cl.
  CPC ............ *G06V 20/52* (2022.01); *H04N 7/181* (2013.01); *H04N 23/695* (2023.01); *H04N 23/90* (2023.01); *H04N 23/959* (2023.01); *G06T 2207/30232* (2013.01)

(56) References Cited

U.S. PATENT DOCUMENTS

| | | | | |
|---|---|---|---|---|
| 2017/0085771 | A1* | 3/2017 | Schwager | H04N 5/2352 |
| 2018/0329020 | A1 | 11/2018 | Hafizovic et al. | |
| 2020/0043346 | A1* | 2/2020 | Vacek | G08G 5/0082 |
| 2020/0389580 | A1* | 12/2020 | Kodama | G03B 15/00 |

FOREIGN PATENT DOCUMENTS

| | | | |
|---|---|---|---|
| KR | 100879623 | B1 * | 1/2009 |
| KR | 10-2013-0000660 | A | 1/2013 |
| KR | 10-1321006 | B1 | 10/2013 |
| KR | 10-2016-0007039 | A | 1/2016 |
| KR | 1020160007039 | A * | 3/2016 |
| KR | 10-2018-0105483 | A | 9/2018 |
| KR | 10-1977635 | B1 | 5/2019 |
| KR | 101977635 | B1 * | 5/2019 |

OTHER PUBLICATIONS

Moritz Kohls et al., "Expected Coverage of Random Walk Mobility Algorithm", Department of Electrical Engineering and Information Technology Technische Universitat Dortmund, Germany, Jan. 30, 2018.

Young-Il Kim et al., "The analysis of image acquisition method for Anti-UAV surveillance using cameras image", ICTC 2020.

* cited by examiner

Installation location of camera of image sensor

METHOD AND APPARATUS FOR CONFIGURING DETECTION AREA BASED ON ROTATABLE CAMERA

CROSS-REFERENCE TO RELATED APPLICATIONS

This application claims priority to and the benefit of Korean Patent Application No. 10-2019-0152717 filed in the Korean Intellectual Property Office on Nov. 25, 2019, and Korean Patent Application No. 10-2020-0159484 filed in the Korean Intellectual Property Office on Nov. 25, 2020, the entire contents of which are incorporated herein by reference.

BACKGROUND OF THE INVENTION

1. Field of the Invention

The present invention relates to a method and apparatus for configuring detection areas based on a rotating camera. More particularly, the present invention relates to a method and apparatus for configuring detection areas based on a rotating camera for configuring the detection area of an unmanned aerial vehicle to detect and track the invasion of an unmanned aerial vehicle based on images of the unmanned aerial vehicle invading a prohibited area.

2. Description of Related Art

In recent years, social unrest has risen due to the invasion of airports, public places, and protected areas by small UAVs (unmanned aerial vehicles). In particular, various technologies are applied to protect people and property from attacks on small UAVs used for military purposes. Applicable technologies may include radar-based detection technology, video signal analysis-based UAV detection technology, and noise characteristics-based UAV detection technology, but it is difficult to detect and track when the size of the UAV is small.

In particular, in order to protect a specific area from the invasion of the UAV by analyzing the characteristics of the UAV image, it is necessary to monitor the protected area in real time using a camera. At this time, in the case of photographing a small UAV at a long distance, the size of the UAV image is too small to detect and track the UAV. Therefore, a zoom lens is used to obtain a UAV image of a certain size or more. However, when high zoom ratio is used, the angle of view of the camera is reduced, and accordingly, the number of installed cameras increases to cover the entire protected area, such that an economically disadvantageous problem arises.

SUMMARY OF THE INVENTION

The present invention has been made in an effort to provide a method and apparatus for configuring detection areas based on a rotating camera capable of reducing the number of cameras installed in detecting an invasion of a UAV by analyzing images of the UAV invading a protected area.

According to an embodiment of the present invention, a method for configuring detection areas based on a rotatable camera to detect an unmanned aerial vehicle (UAV) in a monitoring area using the rotatable camera in an integrated sensor is provided. The method for configuring detection areas based on a rotatable camera includes: configuring a first detection area in the monitoring area by fixing the focal length of the camera to an initial value and rotating the camera; and configuring a second detection area in the monitoring area by rotating the camera after changing at least one of the focal length of the camera and a rotation path representing a distance from the origin of the monitoring area.

The configuring of the second detection area may include changing at least one of the focal length and the rotation path of the camera according to a rotation period of the camera.

The configuring the second detection area may include changing the focal length of the camera according to the rotation period so that the beam area of the camera is formed from the outermost area of the monitoring area to the center area.

The changing the focal length of the camera according to the rotation period may include: estimating a time for the UAV to fly from the foremost surface area of the monitoring area to the beam area of the camera; and changing the focal length according to the rotation period of the camera during the estimated time.

The method for configuring detection areas based on a rotatable camera may further include determining the rotational angular velocity of the camera based on the velocity of the UAV.

The determining may include: dividing a velocity vector of the UAV into a velocity component horizontal to a moving direction of the camera beam and a velocity component vertical to the moving direction of the camera beam; and determining the rotational angular velocity of the camera as a larger value among the rotational angular velocity of the camera obtained from the velocity component horizontal to the moving direction and the rotation angular velocity of the camera obtained from the velocity component vertical to the moving direction.

The method for configuring detection areas based on a rotatable camera may further include: extracting a speed of the UAV from an image stream photographed by the camera; and changing a rotation angle of the camera based on the speed of the UAV.

The changing the rotation angle of the camera may include, when two or more UAVs in the monitoring area are detected, changing the rotation angle of the camera based on the highest speed among the speeds of the two or more UAVs.

According to another embodiment of the present invention, a method for configuring detection areas based on rotatable cameras to detect an unmanned aerial vehicle (UAV) in a monitoring area using the rotatable cameras with an integrated sensor is provided. The method for configuring detection areas based on rotatable cameras includes: configuring different detection areas in the monitoring area by rotating a plurality of cameras; and determining rotational angular velocity of the plurality of cameras based on a velocity of the UAV.

The configuring may include setting different focal lengths or angles of view of the plurality of cameras.

The determining may include: dividing a velocity vector of the UAV into a velocity component horizontal to a moving direction of the camera beam and a velocity component vertical to the moving direction of the camera beam; and determining the rotational angular velocity of the camera as a larger value among the rotational angular velocity of the camera obtained from the velocity component horizontal to the moving direction and the rotation angular velocity of the camera obtained from the velocity component vertical to the moving direction.

The configuring may include changing at least one of a focal length of each camera and a rotation path representing a distance from the origin of the monitoring area according to a rotation period of the each camera.

The changing may include changing at least one of the focal length and the rotation path of each camera according to the rotation period of the each camera so that the detection areas of the plurality of cameras are mutually exclusively configured.

According to yet another embodiment of the present invention, an apparatus for configuring detection areas based on a rotatable camera to detect an unmanned aerial vehicle (UAV) in a monitoring area using at least one rotatable camera in an integrated sensor is provided. The apparatus for configuring detection areas based on a rotatable camera may include a management module and a camera control module. The management module monitors the operation state of the at least one rotatable camera and generates information about the detection area of the at least one rotatable camera through the monitoring. The camera control module configures the detection area of the at least one rotatable camera mutually exclusively by changing at least one of the focal length of the camera and a rotation path representing a distance from the origin of the monitoring area based on the information about the detection area of the at least one rotatable camera.

The camera control module may configure a first detection area by fixing the focal length of each rotatable camera to an initial value and rotating a corresponding camera, and configure a second detection area by changing at least one of the focal length of the corresponding camera and the rotation path and rotating the corresponding camera.

The camera control module may change at least one of the focal length and the rotation path of the corresponding camera according to a rotation period of the corresponding camera.

The camera control module may determine the rotational angular velocity of the corresponding camera based on the velocity of the UAV.

The camera control module may divide a velocity vector of the UAV into a velocity component horizontal to a moving direction of the camera beam and a velocity component vertical to the moving direction of the camera beam, and may determine the rotational angular velocity of the camera as a larger value among the rotational angular velocity of the camera obtained from the velocity component horizontal to the moving direction and the rotation angular velocity of the camera obtained from the velocity component vertical to the moving direction.

The camera control module may extract a speed of the UAV from an image stream photographed by the camera, and change a rotation angle of the camera based on the speed of the UAV.

The camera control module may change the focal length of the camera according to the rotation period so that a beam area of the camera is formed from the outermost area of the monitoring area to the center area.

DETAILED DESCRIPTION OF THE EMBODIMENTS

Figure 1:
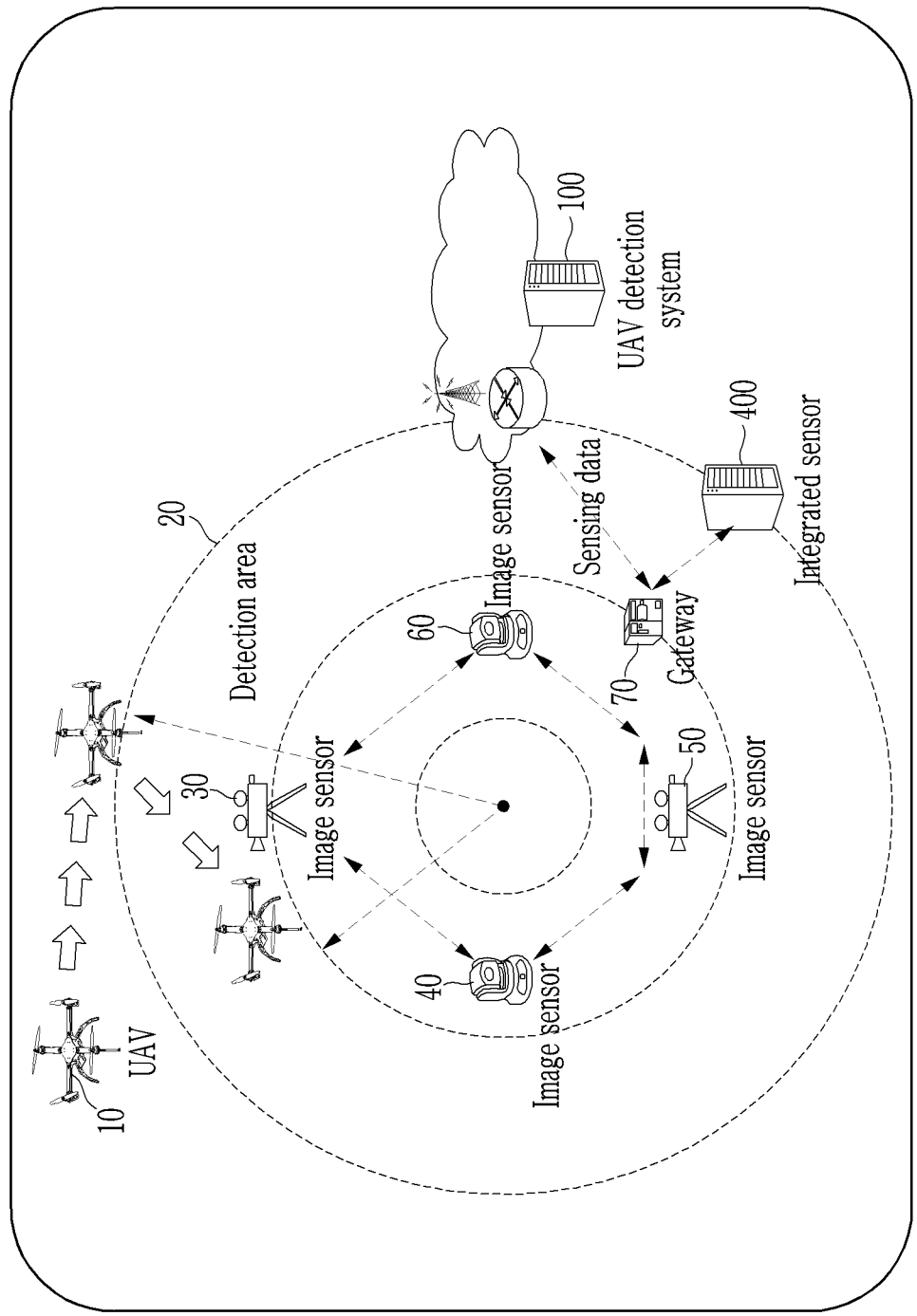
FIG. 1 is a conceptual diagram illustrating an image signal-based UAV detection technology to which an embodiment of the present invention is applied.

Hereinafter, embodiments of the present invention will be described in detail with reference to the attached drawings so that a person of ordinary skill in the art may easily implement the present invention. The present invention may be modified in various ways, and is not limited thereto. In the drawings, elements that are irrelevant to the description of the present invention are omitted for clarity of explanation, and like reference numerals designate like elements throughout the specification.

Throughout the specification and claims, when a part is referred to "include" a certain element, it means that it may further include other elements rather than exclude other elements, unless specifically indicated otherwise.

Hereinafter, a method and apparatus for configuring a detection area based on a rotating camera according to embodiments of the present invention will be described in detail with reference to the accompanying drawings.

FIG. 1 is a conceptual diagram illustrating an image signal-based UAV detection technology to which an embodiment of the present invention is applied.

Referring to FIG. 1, a UAV protection area to be monitored for invasion of the UAV 10 is set as a monitoring area 20.

A plurality of image sensors 30, 40, 50, and 60 for monitoring detection of the UAV 10 are installed in the monitoring area 20. A detection area for detecting the UAV 10 is configured by the plurality of image sensors 30, 40, 50, and 60. In this case, the detection area by the plurality of image sensors 30, 40, 50, and 60 may be configured to monitor the entire monitoring area 20. That is, the required number and installation location of image sensors in the monitoring area 20 may be determined so that the entire monitoring area 20 can be monitored in consideration of the performance of the image sensor to be installed, the size of the monitoring area 20, etc.

The image sensors 30, 40, 50, and 60 have an Internet of Things (IoT) service interface, and may be interconnected through wireless communication between the image sensors 30, 40, 50, and 60.

The image sensors 30, 40, 50, and 60 acquire UAV detection results and image data of the UAV 10 in the set detection area, respectively, and provide the UAV detection result and image data of the UAV 10 through the gateway 70 to an external UAV detection system 100.

The gateway 70 serves to connect the image sensors 30, 40, 50, and 60 to an external network. The gateway 70 transmits the UAV detection results and image data of the UAV 10 to the external UAV detection system 100 and an integrated sensor 400.

The integrated sensor 400 serves to increase the detection rate by integrating the UAV detection results of the image sensors 30, 40, 50, and 60. In order to detect and track the UAV 10 by analyzing the images of the UAV 10, image data of a certain size or more is required. In general, the image sensors 30, 40, 50, and 60 use a camera having a zoom function to secure image data of a certain size or more. At this time, when the zoom function is used to detect the UAV 10 at a long distance, the angle of view of the camera decreases and the detection area of the corresponding image sensor decreases. Accordingly, the number of cameras that is, image sensors required in the monitoring area 20, is increased.

In an embodiment of the present invention, a rotating camera having a zoom function is used to secure image data of a certain size or more, and by controlling an image sensor equipped with the rotating camera having a zoom function, the detection area by the corresponding camera is efficiently configured. Thus, it is possible to reduce the number of image sensors required in the monitoring area 20.

Figure 2:
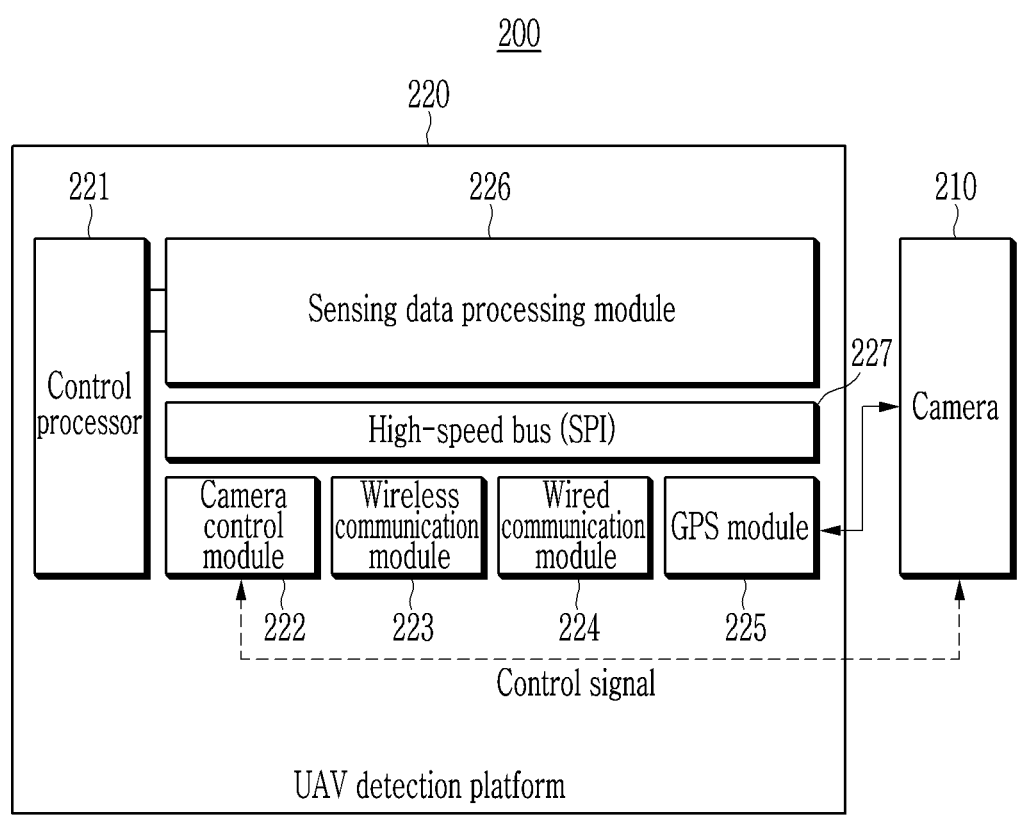
FIG. 2 is a diagram showing the configuration of an image sensor according to an embodiment of the present invention.

FIG. 2 is a diagram showing the configuration of an image sensor according to an embodiment of the present invention.

Referring to FIG. 2, the image sensor 200 includes a camera 210 and a UAV detection platform 220. The image sensor 200 represents image sensors 30, 40, 50, and 60 installed in the monitoring area 20 shown in FIG. 1.

The camera 210 is a rotating camera with a zoom function. For example, the camera 210 may be a Panning Tilting Zoom (PTZ) camera for performing a zoom operation to variably adjust the zoom magnification, a pan operation to rotate the camera angle horizontally, and a tilt operation to rotate the camera angle vertically.

The camera 210 configures a detection area to be sensed and photographs an image within the detection area.

The UAV detection platform 220 includes a control processor 221, a camera control module 222, a wireless communication module 223, a wired communication module 224, a Global Positioning System (GPS) module 225, and a sensing data processing module 226. The control processor 221, the camera control module 222, the wireless communication module 223, the wired communication module 224, the GPS module 225, and the sensing data processing module 226 in the UAV detection platform 220 are interconnected through a high-speed bus 227.

The control processor 221 controls the overall configuration and function of the sensor.

The camera control module 222 controls the camera 210 by generating a signal for controlling the pan-tilt-zoom of the camera 210.

The wireless communication module 223 is a wireless communication interface for interworking between image sensors, and the wired communication module 224 is a wired communication interface for interworking between image sensors. For example, the wireless communication module 223 may support WiFi communication, and the wired communication module 224 may support Ethernet communication.

The GPS module 225 receives satellite signals transmitted from GPS satellites, extracts location information, and provides location information for interworking between image sensors.

The sensing data processing module 226 performs a UAV detection operation using images photographed from the camera 210. The sensing data processing module 226 may transmit the detection result of the UAV 10 through the wireless communication module 223. The detection result may include, for example, a type, a detection time, a detection location, and a detection probability.

When configuring a detection area capable of detecting the UAV 10 through the camera 210, an image size (for example, 100×100 pixels) of the UAV 10 should be sufficiently secured to secure feature points of the image. In addition, when the camera 210 having an auto focus function is used, it takes time to focus the camera 210 on the UAV 10, and the accuracy of detection of the UAV 10 may be reduced due to a blurred image before focusing.

Figure 3:
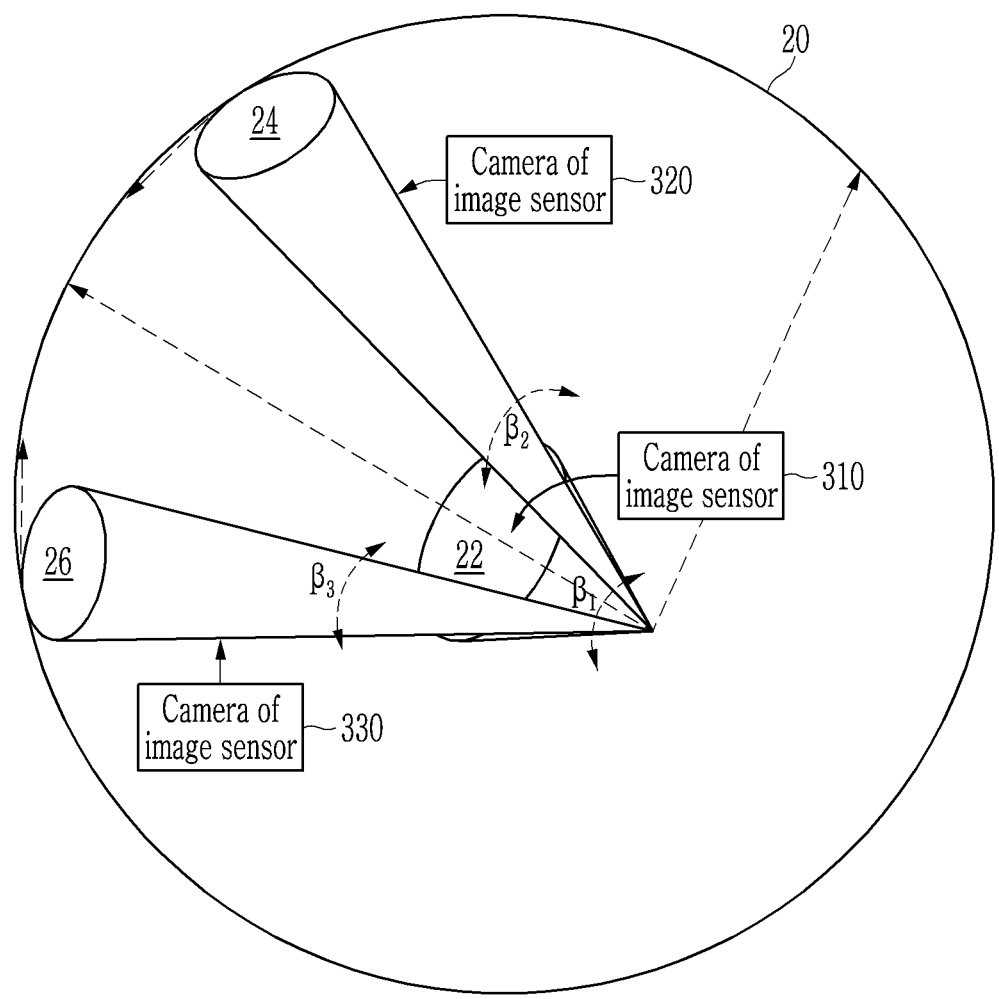
FIG. 3 is a diagram illustrating a basic concept of a configuration of a UAV detection area according to an embodiment of the present invention.

FIG. 3 is a diagram illustrating a basic concept of a configuration of a UAV detection area according to an embodiment of the present invention. In FIG. 3, only the camera of the image sensor is shown for convenience, but it is natural that the image sensor is composed of the camera and the UAV detection platform as described in FIG. 2.

Referring to FIG. 3, in an embodiment of the present invention, a method of configuring detection areas by fixing the angle of view and magnification of cameras 310, 320, and 330 in advance and rotating the cameras 310, 320, and 330 may be used. In FIG. 3, an example of configuring detection areas within the monitoring area 20 by using the cameras 310, 320, and 330 of three image sensors is shown.

The integrated sensor 400 controls the cameras 310, 320, and 330 so that the detection areas formed by the cameras 310, 320, and 330 cover the entire monitoring area 20.

The camera 310 has an angle of view of $\beta_1$ in order to monitor a short distance and rotates to form a detection area of the short distance. The angle of view may mean horizontal and vertical angles of the view. That is, the beam area 22 of the camera 310 is formed by the angle of view of $\beta_1$, and the detection area of the camera 310 is formed according to the rotation trajectory of the beam area 22 from the rotation of the camera 310. The image sensor having the corresponding camera 310 detects a UAV invading the detection area of the camera 310 at the short distance.

The camera 320 has an angle of view of $\beta_2$ in order to monitor a long distance and rotates to form a detection area of the long distance. The beam area 24 of the camera 320 is formed by the angle of view of $\beta_2$, and the detection area of the camera 320 is formed according to the rotation trajectory of the beam area 24 from the rotation of the camera 320. The camera 330 has an angle of view of $\beta_3$ in order to monitor the long distance, and rotates to form a detection area of the long distance. Likewise, the beam area 26 of the camera 330 is formed by the angle of view of $\beta_3$, and the detection area of the camera 330 is formed according to the rotation trajectory of the beam area 26 from the rotation of the camera 330. The image sensors having the corresponding cameras 320 and 330 detect the UAV 10 invading the detection area of the corresponding cameras 320 and 330 from the long distance. At this time, $\beta_2$ and $\beta_3$ are smaller than $\beta_1$, and the rotation directions of the cameras 320 and 330 may be set to be opposite to each other.

The integrated sensor 400 may determine the angles of view $\beta_1$, $\beta_2$, and $\beta_3$ of the cameras 310, 320, and 330, and control the rotation of the cameras 310, 320, and 330.

Figure 4:
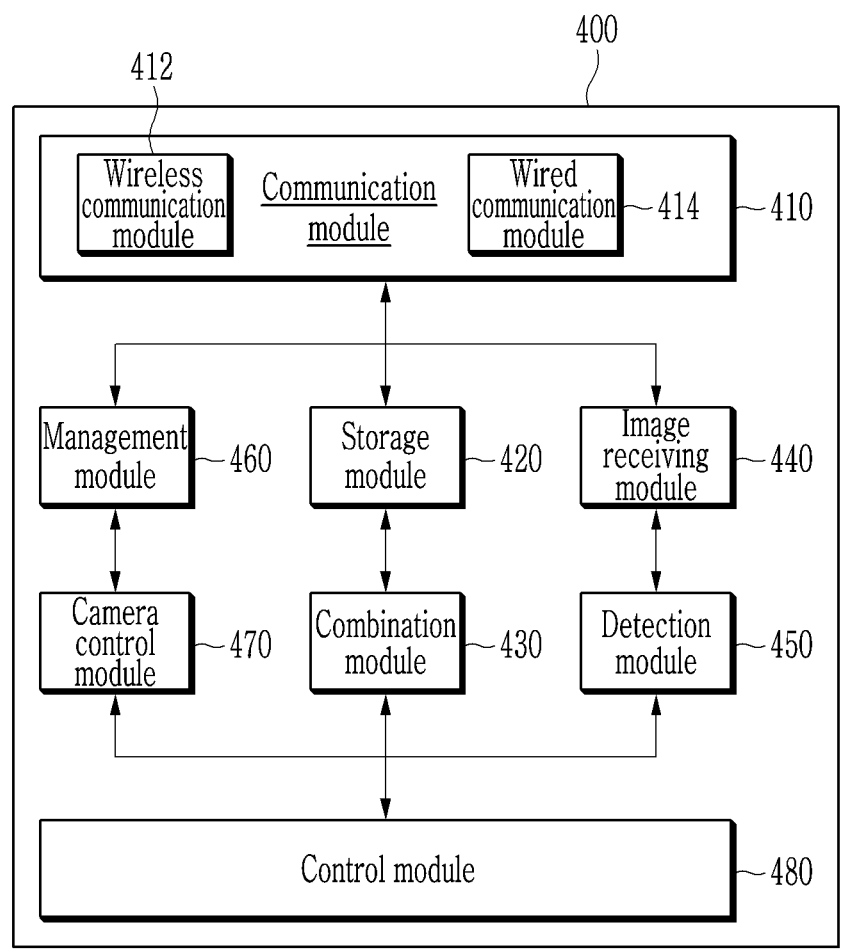
FIG. 4 is a diagram showing the configuration of an integrated sensor according to an embodiment of the present invention.

FIG. 4 is a diagram showing the configuration of an integrated sensor according to an embodiment of the present invention.

Referring to FIG. 4, the integrated sensor 400 includes a communication module 410, a storage module 420, a combination module 430, an image receiving module 440, a detection module 450, a management module 460, a camera control module 470, and a control module 480.

The communication module 410 receives the detection results of the UAV 10 from the image sensors 30, 40, 50, and 60 in FIG. 1 or the image streaming obtained from the camera of the image sensors 30, 40, 50, and 60 in FIG. 1. The communication module 410 may include a wireless communication module 412 and a wired communication module 224.

The storage module 420 stores the detection results of the UAV 10 from the image sensors 30, 40, 50, and 60.

The combining module 430 increases the detection probability of the UAV 10 by combining the detection results of the UAV 10 from the image sensors 30, 40, 50, and 60. As the UAV 10 flies, the image sensors 30, 40, 50, and 60 transmit the detection results of the UAV 10 to the integrated sensor 400, respectively. Since each image sensor 30, 40, 50, and 60 detects the UAV 10 with different accuracy according to the change of the posture of the flying UAV 10, the combining module 430 may increase the detection probability by combining the detection results of the UAV 10 in each image sensor 30, 40, 50, and 60. At this time, the combining module 430 may combine by applying weights to the detection results of the UAV in the image sensor 30, 40, 50, and 60.

The image receiving module 440 receives the image streaming obtained from the cameras of each image sensor 30, 40, 50, and 60.

The detection module 450 detects the UAV 10 by analyzing the image streaming acquired from the cameras of each of the image sensors 30, 40, 50, and 60. This case corresponds to the case of utilizing the high-performance computing capability of the integrated sensor 400 capable of performing an algorithm for detecting the UAV 10 by receiving multiple streaming images.

The management module 460 may monitor operation states of the image sensors 30, 40, 50, and 60, and generate detection area information of the image sensors 30, 40, 50, and 60 through monitoring.

Based on the monitoring result of the management module 460, the camera control module 470 controls the cameras of each of the image sensors 30, 40, 50, and 60 to divide the detection area between the image sensors 30, 40, 50, and 60. The camera control module 470 may control the detection areas of the cameras so that the entire monitoring area 20 can be monitored using a small number of cameras installed in the monitoring area 20.

The control module 480 performs an overall control function for the integrated sensor 400.

Figure 5:
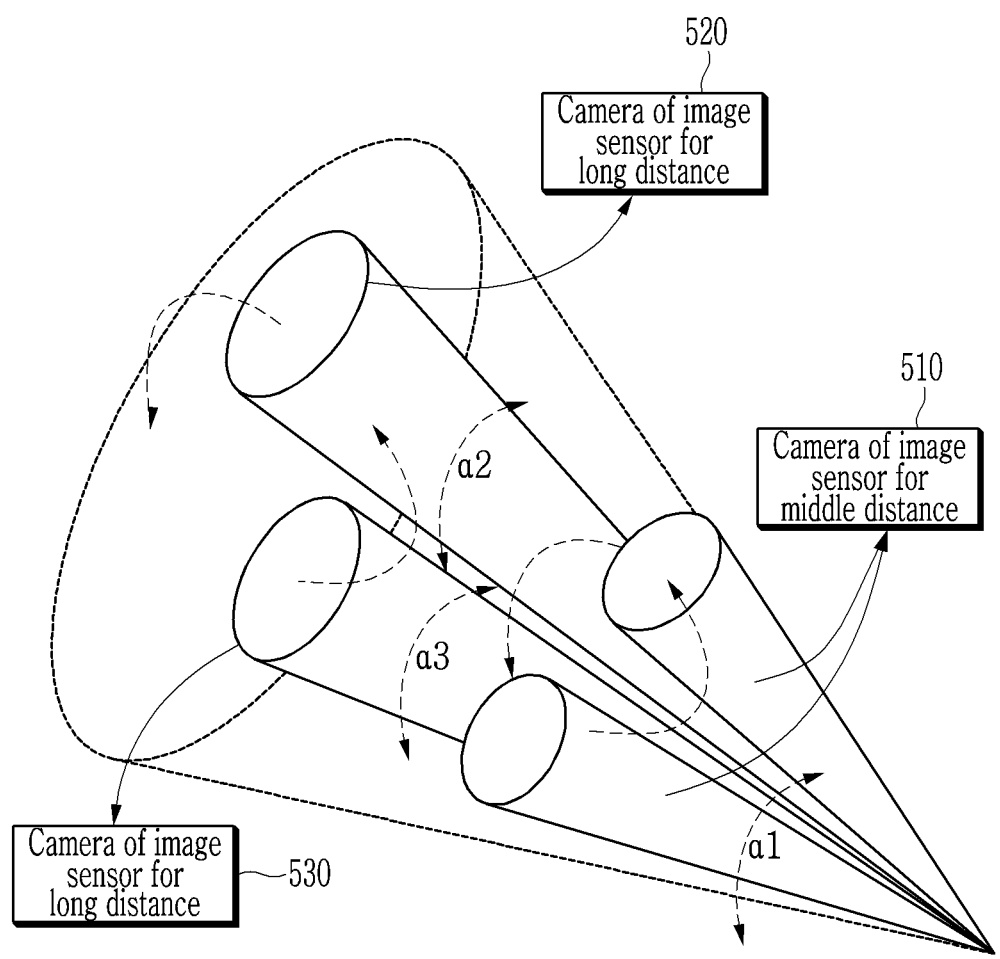
FIG. 5 is a diagram illustrating an example of a method for arranging cameras according to an embodiment of the present invention.

FIG. 5 is a diagram illustrating an example of a method for arranging cameras according to an embodiment of the present invention.

Referring to FIG. 5, the camera 510 of the image sensor fixes the focal length to $\alpha_1$, and then rotates to form a detection area of a middle distance according to the control of the camera control module 470, so as to detect the UAV 10 existing at a distance corresponding to the middle distance from the origin of the monitoring area 20.

The cameras 520 and 530 of the image sensors fixes the focal length to $\alpha_2$ and $\alpha_3$, and then rotate to form detection areas of a long distance according to the control of the camera control module 470, respectively, so as to detect the UAV 10 existing at a distance corresponding to the long distance from the origin of the monitoring area 20.

The camera control module 470 of the integrated sensor 400 controls the cameras 510, 520, and 530 of the image sensors based on the detection area information of the image sensors, so as to configure the detection areas mutually exclusively.

Figure 6:
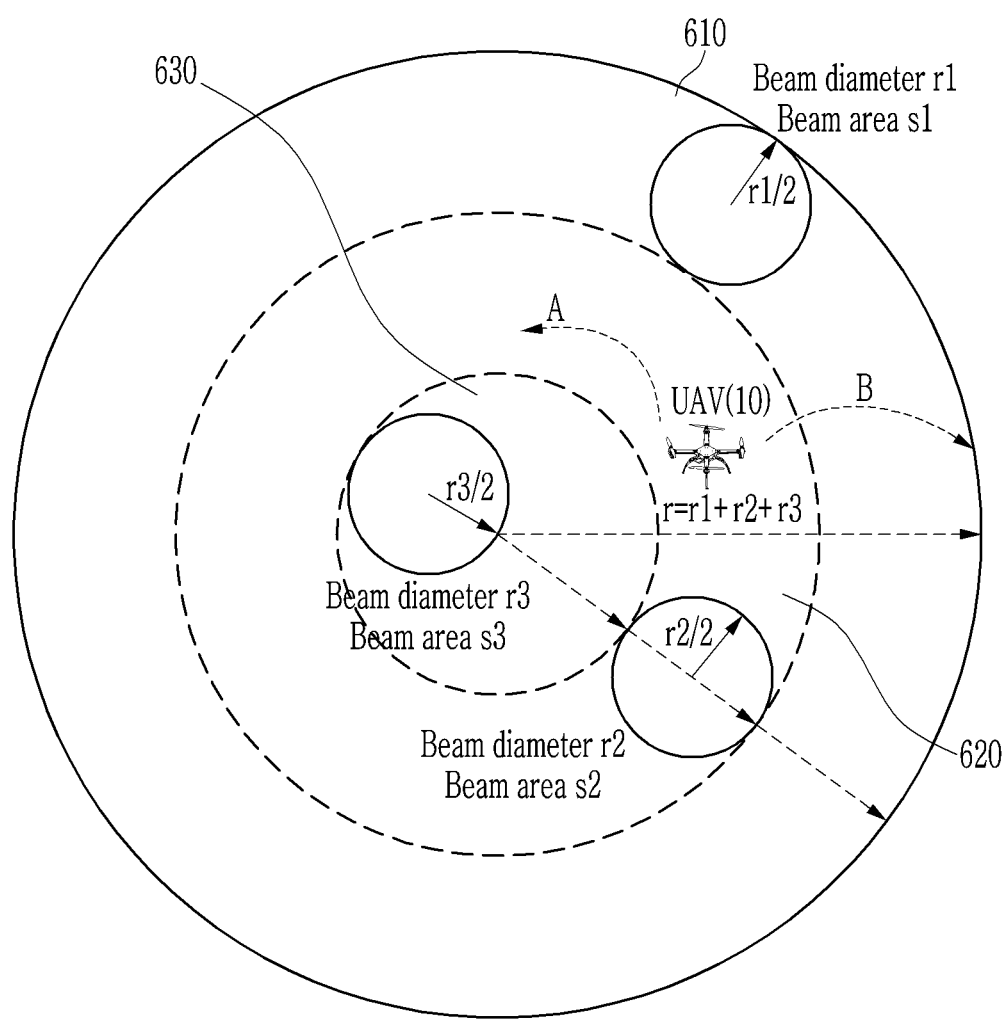
FIG. 6 is a diagram illustrating an example of a method for controlling a rotational angular velocity of a camera according to an embodiment of the present invention.

FIG. 6 is a diagram illustrating an example of a method for controlling a rotational angular velocity of a camera according to an embodiment of the present invention. FIG. 6 shows an example of configuring detection areas for detecting the UAV 10 while three cameras rotate.

Referring to FIG. 6, the monitoring area may be divided into an outermost detection area 610, a middle detection area 620, and a center detection area 630.

The outermost detection area 610 is configured by rotating a camera having a beam diameter of r1 and a beam area of s1. The middle detection area 620 is configured by rotating a camera having a beam diameter of r2 and a beam area of s2, and the center detection area 630 is configured by rotating a camera having a beam diameter of r3 and a beam area of s3.

In general, when the camera moves at an angular velocity, the rotational angular velocity co of the beam can be expressed as Equation 1 when the moving velocity of the beam at a point separated by ρ from the origin of the monitoring area is $v_c$.

$$\omega = \frac{v_c}{\rho} \quad \text{(Equation 1)}$$

In the case of moving the UAV 10 across the monitoring area 20, when the beam diameter of the camera is r, since the camera has to rotate at least one turn (360 degrees) during the maximum time taw that the UAV 10 stays in the beam area of the camera, and in order to detect the UAV 10 of the flight speed $v_d$ in the corresponding rotation trajectory by the camera, the minimum rotational angular velocity of the camera must be greater than $\omega_{c\_min1}$ as shown in Equation 2, and the maximum time taw can be calculated as shown in Equation 3.

$$\omega_{c\_min1} \geq \frac{360}{t_{dw}} \quad \text{(Equation 2)}$$

$$t_{dw} = \frac{r}{v_d} \quad \text{(Equation 3)}$$

In addition, when the UAV 10 rotates around the origin of the monitoring area at a point separated by l from the origin of the monitoring area 20, the beam movement speed of the camera must be greater than the flight speed $v_d$ of the UAV 10. Therefore, the minimum rotational angular speed of the camera must be greater than $\omega_{c\_min2}$.

$$\omega_{c\_min2} \geq \frac{v_d}{l} \quad \text{(Equation 4)}$$

Accordingly, the minimum rotational angular velocity $\omega_c$ of the camera may be determined as a larger value among $\omega_{c\_min1}$ and $\omega_{c\_min2}$ as shown in Equation 5.

$$\omega_c = \max(\omega_{c\_min1}, \omega_{c\_min2}) \quad \text{(Equation 5)}$$

That is, the UAV 10 moves at a velocity of $V_d$ in an arbitrary direction. Accordingly, the velocity vector of the UAV 10 can be decomposed into a vertical direction component and a horizontal direction component with respect to the moving direction of the camera beam. In this way, Equation 2 corresponds to the case where the velocity component of the UAV 10 is vertical to the moving direction of the camera beam, and Equation 2 corresponds to the case where the velocity component of the UAV 10 is the same as the moving direction of the camera beam, that is, horizontal to the moving direction of the camera beam.

The camera control module 470 of the integrated sensor 400 may determine the rotational angular velocity of the camera based on Equation 5.

In addition, in order to automatically control the rotational angular velocity of the camera, the detection module 450 of the integrated sensor 400 measures the distance of the UAV 10 from an image stream (for example, images from a stereo camera), and extracts flight speed of the UAV 10 from the distance data measured. The camera control module 470 of the integrated sensor 400 determines the rotation angle of the camera based on the flight speed of the UAV 10, and may autonomously change the rotation angle of the camera. Furthermore, the camera control module 470 of the integrated sensor 400 may determine the rotation angle of the camera based on the maximum speed among the flight speeds of the plurality of UAVs when there are the plurality of UAVs in the monitoring area 20.

Figure 7:
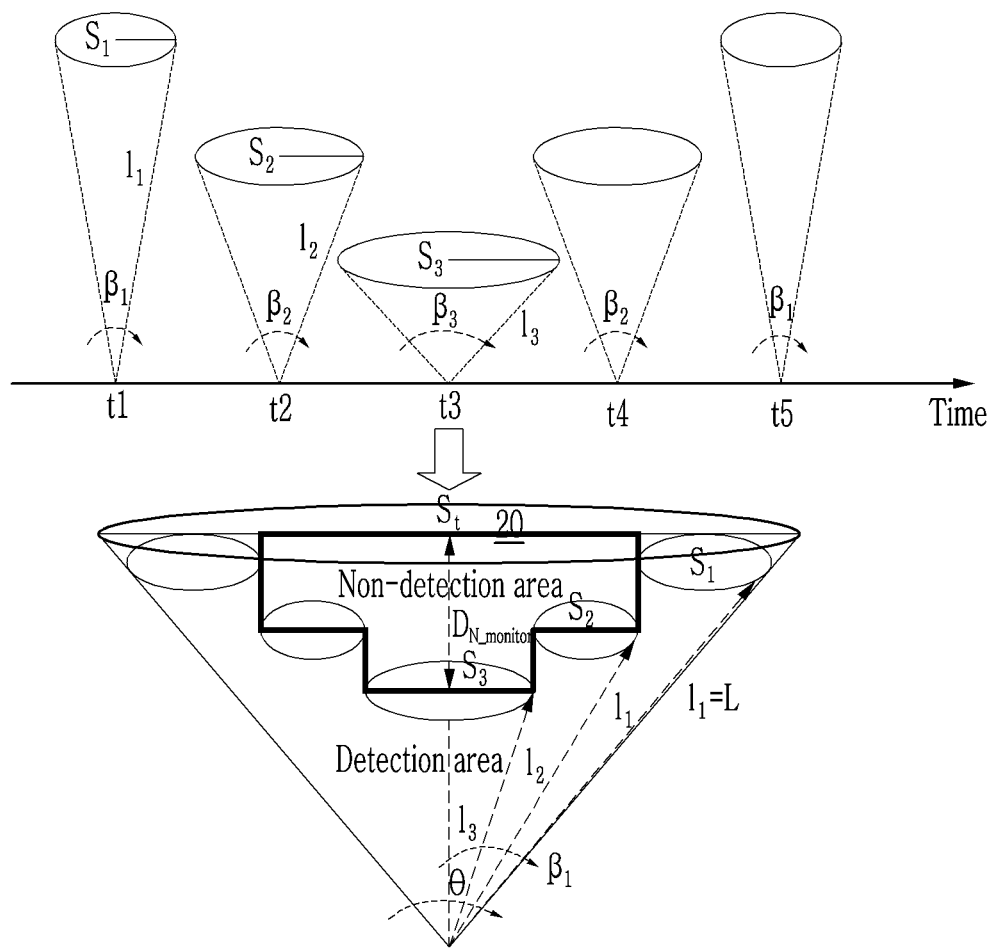
FIG. 7 is a diagram illustrating a change of a monitoring area according to a change of a focal length of a camera according to an embodiment of the present invention.

FIG. 7 is a diagram illustrating a change of a monitoring area according to a variable of a focal length of a camera according to an embodiment of the present invention.

The camera control module 470 of the integrated sensor 400 may configure the detection area of the camera by varying the focal length of the camera and the distance from the origin of the monitoring area 20 every one rotation when the camera is rotated. In this way, the number of cameras in the monitoring area 20 can be reduced. FIG. 7 shows an example of configuring detection areas from the outermost detection area to the inner center detection area by rotating one camera.

As shown in FIG. 7, when the length of the outermost baseline connecting the outermost point from the origin of the monitoring area 20 is L and the angle of the monitoring range is θ, the frontal area St of the monitoring area 20 can be expressed as Equation 6.

$$S_t = \pi * L^2 \sin\left(\frac{\theta}{2}\right)^2$$

The beam surface area Si of the camera whose angle of view is $\beta_i$ at a position separated by $l_i$ from the origin of the monitoring area 20 can be expressed as Equation 7 when $l_i$ is greater than the beam diameter of the camera.

$$s_i = \pi * l_i^2 \sin\left(\frac{\beta_i}{2}\right)^2 \quad \text{(Equation 7)}$$

If the focal length of one camera is fixed and one camera is rotated, the camera can always monitor only a certain distance. Therefore, it is difficult to detect a UAV that invades a certain area after the camera beam passes the certain area.

On the other hand, when the camera rotates while changing the focal length and the position of the beam according to the rotation period as in the embodiment of the present invention, the monitoring area 20 is divided into a detection area capable of detecting the UAV 10 and a non-detection area that cannot detect the UAV 10. However, it is possible to obtain a time gain capable of detecting the UAV 10 in the next rotation period of the camera even if the UAV 10 invades the area after the camera beam passes. FIG. 7 shows a case where the UAV 10 invades from the front. In this case, detection area capable of detecting the UAV 10 becomes the area covered by the camera beam at the camera installation position, and the area not covered the camera beam becomes the non-detection area. That is, when the focal length of the camera is fixed to form a beam at the outermost area of the monitoring area 20 and the camera is rotated, if the UAV 10 moves to the outermost area of the monitoring area 20 after the beam of the camera moves to another area, the UAV 10 cannot be detected. But if the focal length of the camera is changed from the outermost to the inside of the monitoring area 20 according to the rotation period of the camera, the probability of detecting the UAV 10 invading from the outermost of the monitoring area 20 is increased in the next rotation period of the camera. In one example, the probability of detecting the UAV 10 invading from the outermost to the center area may be the highest.

Figure 8:
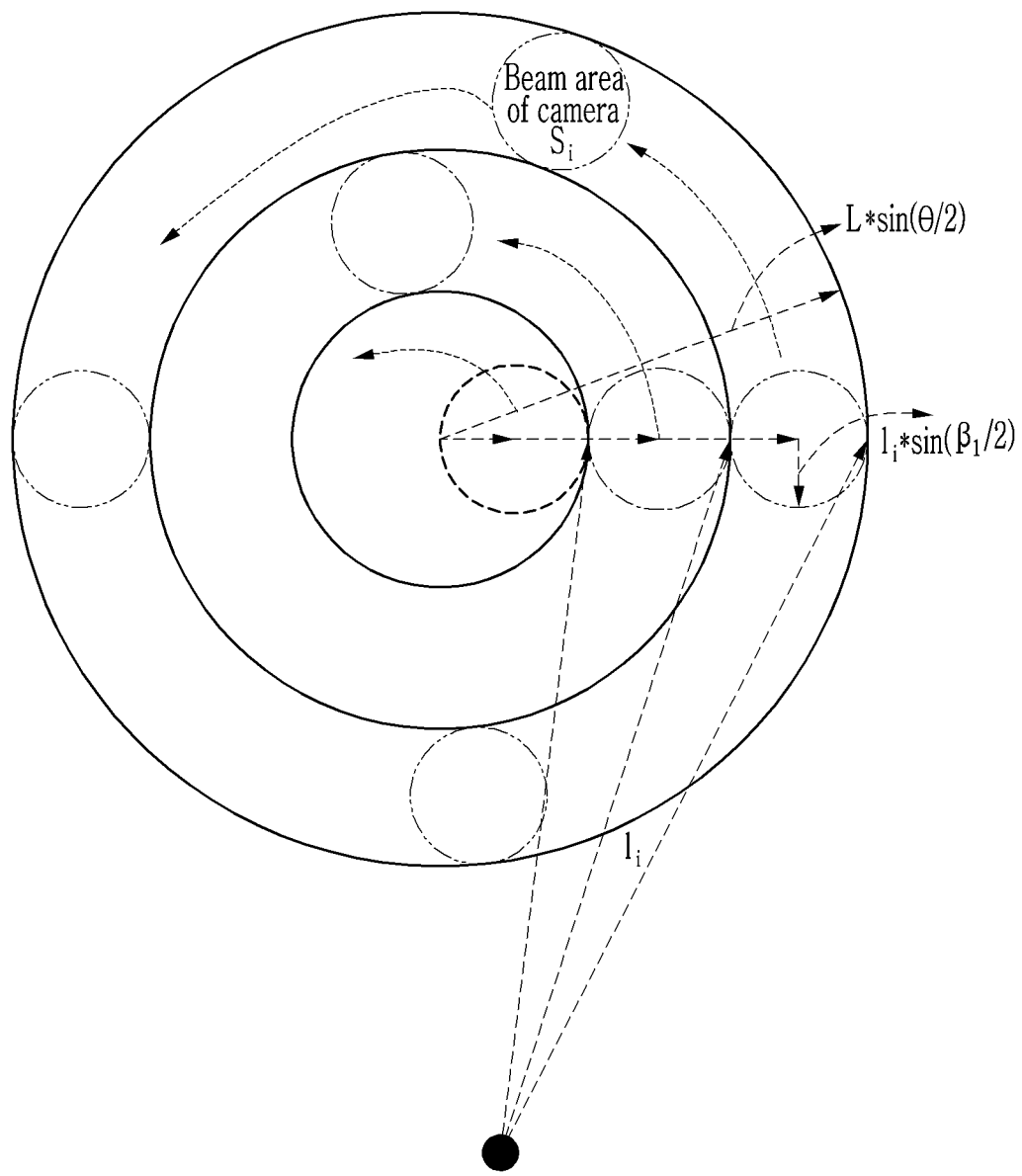
FIG. 8 is a diagram illustrating a trajectory of a rotation beam of a camera according to an embodiment of the present invention.

FIG. 8 is a diagram illustrating a trajectory of a rotation beam of a camera according to an embodiment of the present invention.

Referring to FIG. 8, in order to completely monitor the frontal area of the entire monitoring area 20 using a camera, a multiple of the diameter of the beam surface area of the camera must be greater than the radius of the monitoring area 20 as shown in Equation 8.

$$L * \sin\frac{\theta}{2} \le \sum_{i=1}^{N} 2 * l_i \sin\left(\frac{\beta_i}{2}\right) \quad \text{(Equation 8)}$$

In addition, the distance $r_i$ from the center point of the frontmost surface area of the monitoring area 20 to the center point of the beam surface area of the camera may be calculated as in Equation 9.

$$r_i = \sum_{j=1}^{i-1} l_{j-1} \sin\left(\frac{\beta_i}{2}\right) + l_i \sin\left(\frac{\beta_i}{2}\right) \quad \text{(Equation 9)}$$

$$l_0 = 0$$

The area $S_{ring}$ that monitors the monitoring area 20 during the time $T_i$ in which the camera rotates once can be expressed as Equation 10.

$$s_{ring} = 4\pi * r_i l_i^2 \sin^2\left(\frac{\beta_i}{2}\right) \quad \text{(Equation 10)}$$

When the camera monitors the entire monitoring area 20 with a period of Tp and the number of ring-shaped beam trajectories by the camera is N, the total area $S_{monitor}$ of the monitoring area 20 can be expressed as Equation 11.

$$s_{monitor} = N * s_{ring} (T_i \le t \le T_p) \quad \text{(Equation 11)}$$

On the other hand, when the distance of the monitoring area 20 in FIG. 7 is quite far, the vertical distance $D_{N\_monitor}$ from the frontmost surface area of the monitoring area 20 to the beam surface area Si of the camera can be calculated as in Equation 12.

$$D_{N\_monitor} = L\cos\left(\frac{\theta}{2}\right) - l_i \cos\left(\frac{\beta_i}{2}\right) \quad \text{(Equation 12)}$$

The average distance $D_{N\_mean}$ from the foremost surface area of the monitoring area 20 to the beam surface area of the camera can be expressed as Equation 13.

$$D_{N\_mean} = \frac{\sum_{i=1}^{N} L\cos\left(\frac{\theta}{2}\right) - l_i \cos\left(\frac{\beta_i}{2}\right)}{N} \quad \text{(Equation 13)}$$

Therefore, the time Δtime in which the UAV 10 flies from the foremost surface area of the monitoring area 20 to the average beam surface area of the camera can be estimated simply as in Equation 14, and the camera control module 470 varies the focal length according to the rotation period during the time Δtime. Then, the opportunity (probability) to detect the UAV 10 can be increased.

$$\Delta_{time} = \left\{\frac{\sum_{i=1}^{N} L\cos\left(\frac{\theta}{2}\right) - l_i \cos\left(\frac{\beta_i}{2}\right)}{N}\right\}/v_d \quad \text{(Equation 14)}$$

As described above, according to an embodiment of the present invention, the camera control module 470 can increase the opportunity (probability) for detecting the UAV 10 by dynamically changing the focal length of the camera for each rotation period of the camera. In addition, it is possible to reduce the number of cameras required for the monitoring area 20.

Figure 9:
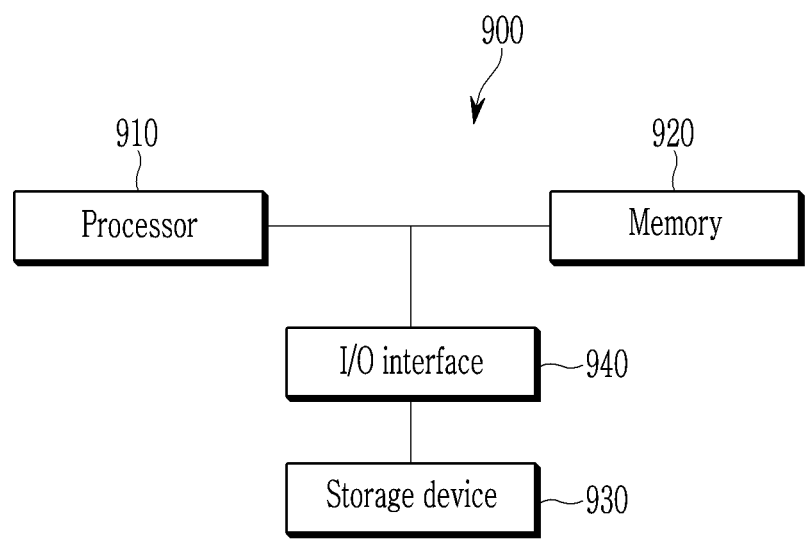
FIG. 9 is a diagram illustrating an apparatus for configuring detection areas based on a rotating camera according to an embodiment of the present invention.

FIG. 9 is a diagram illustrating an apparatus for configuring detection areas based on a rotating camera according to an embodiment of the present invention.

Referring to FIG. 9, the apparatus 900 for configuring detection areas based on a rotating camera includes a processor 910, a memory 920, a storage device 930, and an input/output (I/O) interface 940.

The processor 910 may be implemented as a central processing unit (CPU), another chipset, or a microprocessor.

The memory 920 may be implemented as a medium such as random access memory (RAM), a dynamic random access memory (DRAM), a rambus DRAM (RDRAM), a synchronous DRAM (SDRAM), a static RAM (SRAM), etc.

The storage device 930 may be implemented as a hard disk, an optical disk such as a compact disk read only memory (CD-ROM), a CD rewritable (CD-RW), a digital video disk ROM (DVD-ROM), a DVD-RAM, a DVD-RW disk, Blu-ray disks, etc., a flash memory, or permanent or volatile storage devices such as various types of RAM.

The I/O interface 940 allows the processor 910 and/or the memory 920 to access the storage device 930.

The processor 910 may perform functions for configuring detection areas based on a rotating camera described with reference to FIGS. 1 to 8. The processor 910 may load program instructions for implementing at least some functions of the management module 460 and the camera control module 470 into the memory 920, and may control to perform the operation described with reference to FIGS. 1 to 8. These program commands may be stored in the storage device 930, or may be stored in another system connected through a network.

The processor 910 fixes the focal length of the camera, rotates the camera once within the monitoring area 20, and then repeatedly performs the process of rotating the camera while changing the rotation path of the camera, thereby the detection areas in the monitoring area 20 can be configured. That is, the detection areas in the monitoring area 20 can be configured while changing the distance from the origin of the monitoring area 20 with the rotation period of the camera.

In addition, the processor 910 fixes the focal length of the camera and rotates the camera once in the monitoring area 20, and then repeatedly performs the process of rotating while changing the focal length and rotation path of the camera, thereby the detection areas in the monitoring area 20 can be configured.

Furthermore, the processor 910 divides the flight speed of the UAV 10 invading the monitoring area 20 into the same velocity component as the moving direction of the camera beam and the velocity component vertical to the moving direction of the camera beam, and may control the rotational angular velocity of the camera based on the higher velocity among these velocity components. That is, the processor 910 may determine the rotational angular velocity of the camera based on Equations 2 to 5, in order to control the rotational angular velocity of the camera. Furthermore, the processor 910 may extract the flight speed of the UAV 10 from the distance data of the UAV 10 measured from an image stream, and change the rotation angle of the camera based on the flight speed of the UAV 10. When detecting a plurality of UAVs, the processor 910 can change the rotation angle of the cameras based on the UAV flying at the highest speed, and control the cameras so that the detection areas of each camera are mutually exclusively configured based on the detection area information of the cameras.

According to an embodiment of the present invention, damage caused by the UAV can be prevented in advance by analyzing the images of the UAV, and detecting and classifying the UAV appearing in the protected area in real time. Furthermore, by dynamically changing the focal length of the rotating camera, the number of cameras required can be drastically reduced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for configuring detection areas based on a rotatable camera to detect an unmanned aerial vehicle (UAV) in a monitoring area using the rotatable camera in an integrated sensor, the method comprising:
   configuring a first detection area in the monitoring area by rotating the camera after fixing the focal length of the camera to an initial value; and
   configuring a second detection area in the monitoring area by rotating the camera after changing at least one of the focal length of the camera and a rotation path representing a distance from the origin of the monitoring area, wherein the configuring of the second detection area includes changing at least one of the focal length and the rotation path of the camera according to a rotation period of the camera, wherein the configuring the second detection area includes changing the focal length of the camera according to the rotation period so that the beam area of the camera is formed from the outermost area of the monitoring area to the center area, wherein the changing the focal length of the camera according to the rotation period includes:

estimating a time for the UAV to fly from the foremost surface area of the monitoring area to the beam area of the camera; and changing the focal length according to the rotation period of the camera during the estimated time.

2. The method of claim 1, further comprising determining the rotational angular velocity of the camera based on the velocity of the UAV.

3. The method of claim 2, wherein the determining includes:

dividing a velocity vector of the UAV into a velocity component horizontal to a moving direction of the camera beam and a velocity component vertical to the moving direction of the camera beam; and determining the rotational angular velocity of the camera as a larger value among the rotational angular velocity of the camera obtained from the velocity component horizontal to the moving direction and the rotation angular velocity of the camera obtained from the velocity component vertical to the moving direction.

4. The method of claim 1, further comprising:

extracting a speed of the UAV from an image stream photographed by the camera; and changing a rotation angle of the camera based on the speed of the UAV.

5. The method of claim 4, wherein the changing the rotation angle of the camera includes, when two or more UAVs in the monitoring area are detected, changing the rotation angle of the camera based on the highest speed among the speeds of the two or more UAVs.

6. A method for configuring detection areas based on rotatable cameras to detect an unmanned aerial vehicle (UAV) in a monitoring area using the rotatable cameras with an integrated sensor, the method comprising:

configuring different detection areas in the monitoring area by rotating a plurality of cameras; and determining rotational angular velocity of the plurality of cameras based on a velocity of the UAV, wherein the determining includes:

dividing a velocity vector of the UAV into a velocity component horizontal to a moving direction of the camera beam and a velocity component vertical to the moving direction of the camera beam; and determining the rotational angular velocity of the camera as a larger value among the rotational angular velocity of the camera obtained from the velocity component horizontal to the moving direction and the rotation angular velocity of the camera obtained from the velocity component vertical to the moving direction.

7. The method of claim 6, wherein the configuring includes setting different focal lengths or angles of view of the plurality of cameras.

8. The method of claim 6, wherein the configuring includes changing at least one of a focal length of each camera and a rotation path representing a distance from the origin of the monitoring area according to a rotation period of the each camera.

9. The method of claim 8, wherein the changing includes changing at least one of the focal length and the rotation path of each camera according to the rotation period of the each camera so that the detection areas of the plurality of cameras are mutually exclusively configured.

10. An apparatus for configuring detection areas based on a rotatable camera to detect an unmanned aerial vehicle (UAV) in a monitoring area using at least one rotatable camera in an integrated sensor, the apparatus comprising:

a processor connected to a storage device for loading and executing modules, wherein the modules comprise:

a management module for monitoring the operation state of the at least one rotatable camera and generates information about the detection area of the at least one rotatable camera through the monitoring; and a camera control module for configuring the detection area of the at least one rotatable camera mutually exclusively by changing at least one of the focal length of the camera and a rotation path representing a distance from the origin of the monitoring area based on the information about the detection area of the at least one rotatable camera, wherein the camera control module divides a velocity vector of the UAV into a velocity component horizontal to a moving direction of the camera beam and a velocity component vertical to the moving direction of the camera beam, and determines the rotational angular velocity of the camera as a larger value among the rotational angular velocity of the camera obtained from the velocity component horizontal to the moving direction and the rotation angular velocity of the camera obtained from the velocity component vertical to the moving direction.

11. The apparatus of claim 10, wherein the camera control module configures a first detection area by fixing the focal length of each rotatable camera to an initial value and rotating a corresponding camera, and configures a second detection area by changing at least one of the focal length of the corresponding camera and the rotation path and rotating the corresponding camera.

12. The apparatus of claim 11, wherein the camera control module changes at least one of the focal length and the rotation path of the corresponding camera according to a rotation period of the corresponding camera.

13. The apparatus of claim 10, wherein the camera control module determines the rotational angular velocity of the corresponding camera based on the velocity of the UAV.

14. The apparatus of claim 10, wherein the camera control module extracts a speed of the UAV from an image stream photographed by the camera, and changes a rotation angle of the camera based on the speed of the UAV.

15. The apparatus of claim 10, wherein the camera control module changes the focal length of the camera according to the rotation period so that a beam area of the camera is formed from the outermost area of the monitoring area to the center area.

* * * * *